(12) United States Patent
Ahn

(10) Patent No.: US 9,093,680 B2
(45) Date of Patent: *Jul. 28, 2015

(54) SECONDARY BATTERY WITH AN INSULATION MEMBER THAT DEFINES A GAS RELEASE PATH

(75) Inventor: Chang-Bum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 35 days.

This patent is subject to a terminal disclaimer.

(21) Appl. No.: 13/607,465

(22) Filed: Sep. 7, 2012

(65) Prior Publication Data
US 2013/0230766 A1 Sep. 5, 2013

(30) Foreign Application Priority Data
Mar. 2, 2012 (KR) .................. 10-2012-0022029

(51) Int. Cl.
H01M 2/02 (2006.01)
H01M 2/06 (2006.01)

(52) U.S. Cl.
CPC .................. *H01M 2/06* (2013.01)

(58) Field of Classification Search
CPC ........................................ H01M 2/06
USPC .................................................. 429/179
See application file for complete search history.

(56) References Cited

U.S. PATENT DOCUMENTS

| 6,316,140 B1 * | 11/2001 | Hatazawa et al. .......... 429/163 |
| 2003/0054241 A1 * | 3/2003 | Yamashita et al. .......... 429/181 |
| 2004/0091786 A1 * | 5/2004 | Unoki et al. .................. 429/327 |
| 2007/0202399 A1 | 8/2007 | Shin et al. |

FOREIGN PATENT DOCUMENTS

| JP | 2001-256960 | 9/2001 |
| KR | 10-2007-0049553 | 5/2007 |
| KR | 10-2009-0105619 | 10/2009 |

* cited by examiner

*Primary Examiner* — Nicholas P D'Aniello
(74) *Attorney, Agent, or Firm* — Knobbe Martens Olson & Bear LLP

(57) ABSTRACT

A secondary battery including: an electrode assembly; a battery case accommodating the electrode assembly; a lead terminal that is extended from the electrode assembly and across the battery case, where the lead terminal is withdrawn from the battery case; an encapsulation tape formed on a portion of the lead terminal crossing the battery case; and an insulation member that is formed on the lead terminal to overlap with at least a portion of the encapsulation tape.

16 Claims, 11 Drawing Sheets

SECONDARY BATTERY WITH AN INSULATION MEMBER THAT DEFINES A GAS RELEASE PATH

CROSS-REFERENCE TO RELATED APPLICATIONS

This application claims the benefit of Korean Patent Application No. 10-2012-0022029, filed on Mar. 2, 2012 in the Korean Intellectual Property Office and entitled "SECONDARY BATTERY", the disclosure of which is incorporated herein in its entirety by reference.

BACKGROUND

1. Field

One or more embodiments of the present invention relate to rechargeable secondary batteries.

2. Description of the Related Art

According to technology developments and increases in production of mobile devices such as mobile phones and laptop computers, demand for secondary batteries as an energy source is rapidly increasing. Recently, as an alternative energy source to fossil fuels, research into secondary batteries for use in electric vehicles or hybrid vehicles is actively conducted.

However, an external impact such as a dropping impact during impact resistance tests such as drop tests and oscillation tests or during distribution or use of products may cause an inner short circuit in secondary batteries.

SUMMARY

One or more embodiments of the present invention include secondary batteries in which an inner short circuit between positive and negative electrodes (e.g., due to an external impact) may be substantially inhibited and/or prevented. In case of overheating, explosion or ignition may also be prevented.

Additional embodiments will be set forth, in part in the description which follows, and, in part, will be apparent from the description, or may be learned by practice of the presented embodiments.

According to one or more embodiments of the present invention, a secondary battery includes: an electrode assembly; a battery case accommodating the electrode assembly; a lead terminal that is extended from the electrode assembly and across the battery case, where the lead terminal is withdrawn to the outside of the battery case; an encapsulation tape formed on a portion of the lead terminal crossing the battery case; and an insulation member that is formed on the lead terminal to overlap with at least a portion of the encapsulation tape.

The lead terminal may include a first end portion that is adjacent to the electrode assembly and a second end portion that is withdrawn to the outside, and the insulation member may be extended from the first end portion toward the second end portion so as to overlap with the encapsulation tape.

The first end portion of the lead terminal may be curved.

The lead terminal may have first and second surfaces, and the insulation member may be formed on the first surface of the lead terminal facing the electrode assembly.

The insulation member may be interposed between the lead terminal and the encapsulation tape.

The insulation member may be formed of an insulating resin having a melting point lower than that of the encapsulation tape, and, when abnormal overheating above the melting point occurs, the insulation member may be melted and removed so as to form an opening path between the lead terminal and the encapsulation tape to thereby open the battery case.

The encapsulation tape may be coupled to the battery case.

The insulation member may be formed on the lead terminal, and the encapsulation tape may be formed along a circumference of the lead terminal so as to cover at least a portion of the insulation member.

The lead terminal may have first and second surfaces that face away from each other, and may be connected to an electrode tab withdrawn from the electrode assembly, via the second surface, and the insulation member may be formed on the first surface of the lead terminal.

The insulation member may be also formed on the second surface of the lead terminal, where the insulation member is formed on the second surface except for a portion corresponding to the bonding portion between the lead terminal and the electrode tab.

The insulation member may include first and second insulation members that are spaced apart from each other while including a distance therebetween in a length direction of the lead terminal.

The encapsulation tape may be formed to cover at least a portion of the first and second insulation members and the distance.

According to an increase or a reduction in an overlapping surface area between the encapsulation tape and the first and second insulation members, an opening time of the battery case may be adjusted according to melting of the first and second insulation members.

The insulation member may be formed of an insulating resin having a melting point between about 100° C. and about 150° C.

The insulation member may be formed of an insulation resin having a melting point lower than that of the encapsulation tape by about 10° C. to about 20° C.

The case may include facing first and second cases that are bonded to each other so as to accommodate the electrode assembly, and the encapsulation tape may be formed between facing sealing portions of the first and second cases.

The encapsulation tape may be formed to surround the lead terminal withdrawn to the outside via the facing sealing portions of the first and second cases and the insulation member formed on the lead terminal.

According to one or more embodiments of the present invention, a secondary battery includes: an electrode assembly; a battery case accommodating the electrode assembly; a lead terminal including a first end portion that is electrically connected to an electrode tab withdrawn from the electrode assembly and a second end portion that is extended across the battery case to be withdrawn to the outside; an encapsulation tape formed between the first and second end portions of the lead terminal and on a portion of the lead terminal crossing the battery case; and an insulation member that is extended from the first end portion toward the second end portion so as to overlap with the encapsulation tape.

The insulation member may be formed on at least one of first and second surfaces of the lead terminal, and the encapsulation tape may be formed along a circumference of the lead terminal so as to cover at least a portion of the insulation member.

In a further embodiment, a secondary battery is provided. The secondary battery comprises a battery case comprising a first case and a second case that face each other with an electrode assembly interposed therebetween, wherein the first and second cases are bonding at respective sealing portions of the first and second cases. The secondary battery further comprises a lead terminal extending from the electrode assembly outside of the secondary battery. The secondary battery further comprises an insulating member interposed between the lead terminal and at least one sealing portion. The insulating member adopts a first shape at a first operating temperature of the secondary battery that is lower than the melting temperature of the insulating member and adopts a second shape, different from the first shape, at a second temperature that is higher than the melting temperature of the insulating member. The secondary battery is encapsulated when the insulating member adopts the first shape and an opening is formed in the battery case when the insulating member adopts the second shape.

The melting temperature of the insulating member may be between about 100° C. to about 150° C.

The secondary battery may further comprise an encapsulation tape interposed between the insulating member and an adjacent sealing portion.

The secondary battery may further comprise an encapsulation tape formed between facing sealing portions of the first and second cases.

The melting temperature of the encapsulation tape may be about 10° C. to about 20° C. greater than that of the insulating member. In certain embodiments, the encapsulation tape may be formed from polypropylene.

The insulation member may further comprise first and second insulation members that are spaced apart from each other by a selected distance overlapping the adjacent sealing portion.

The encapsulation tape may cover at least a portion of the first and second insulation members and the separation distance therebetween.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
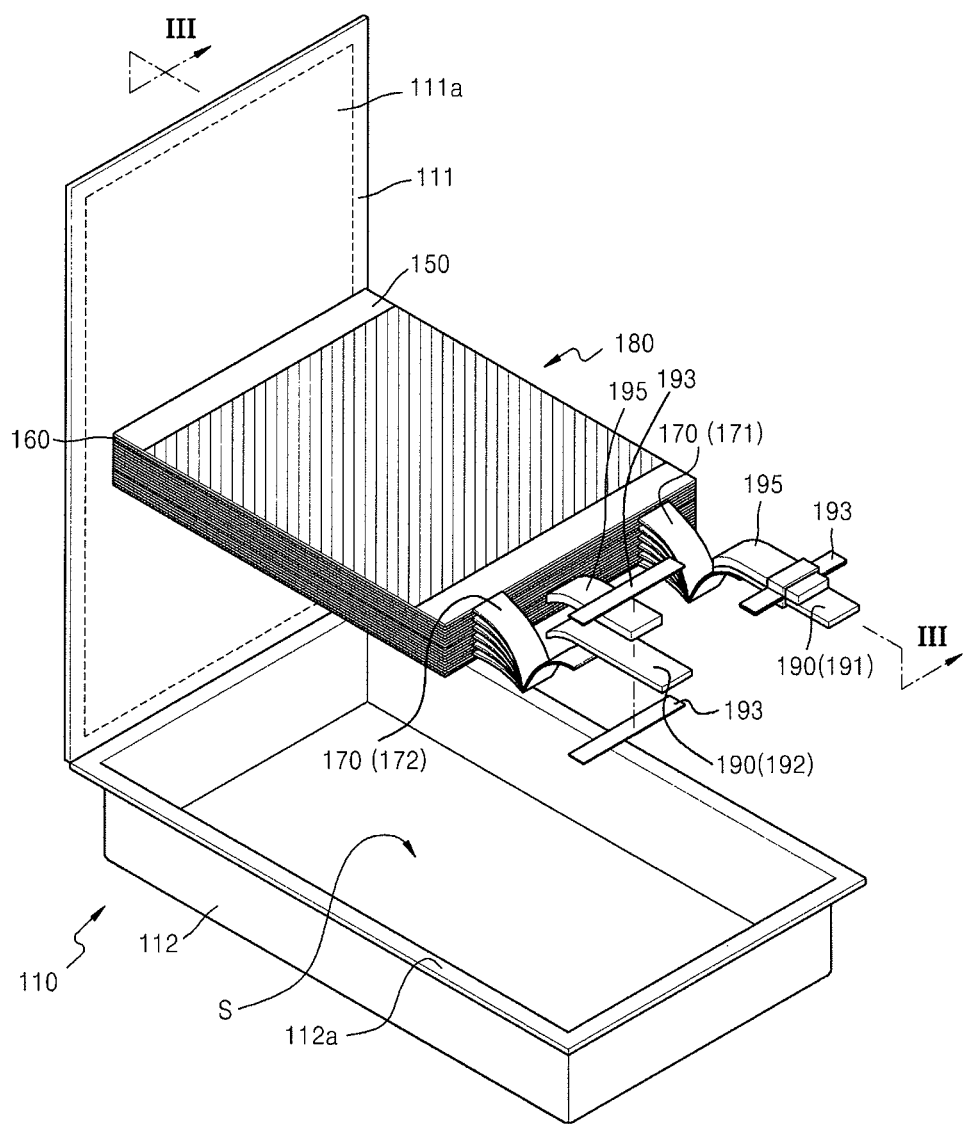
FIG. 1 is a disassembled perspective view of a secondary battery according to an embodiment of the present invention.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Figure 2:
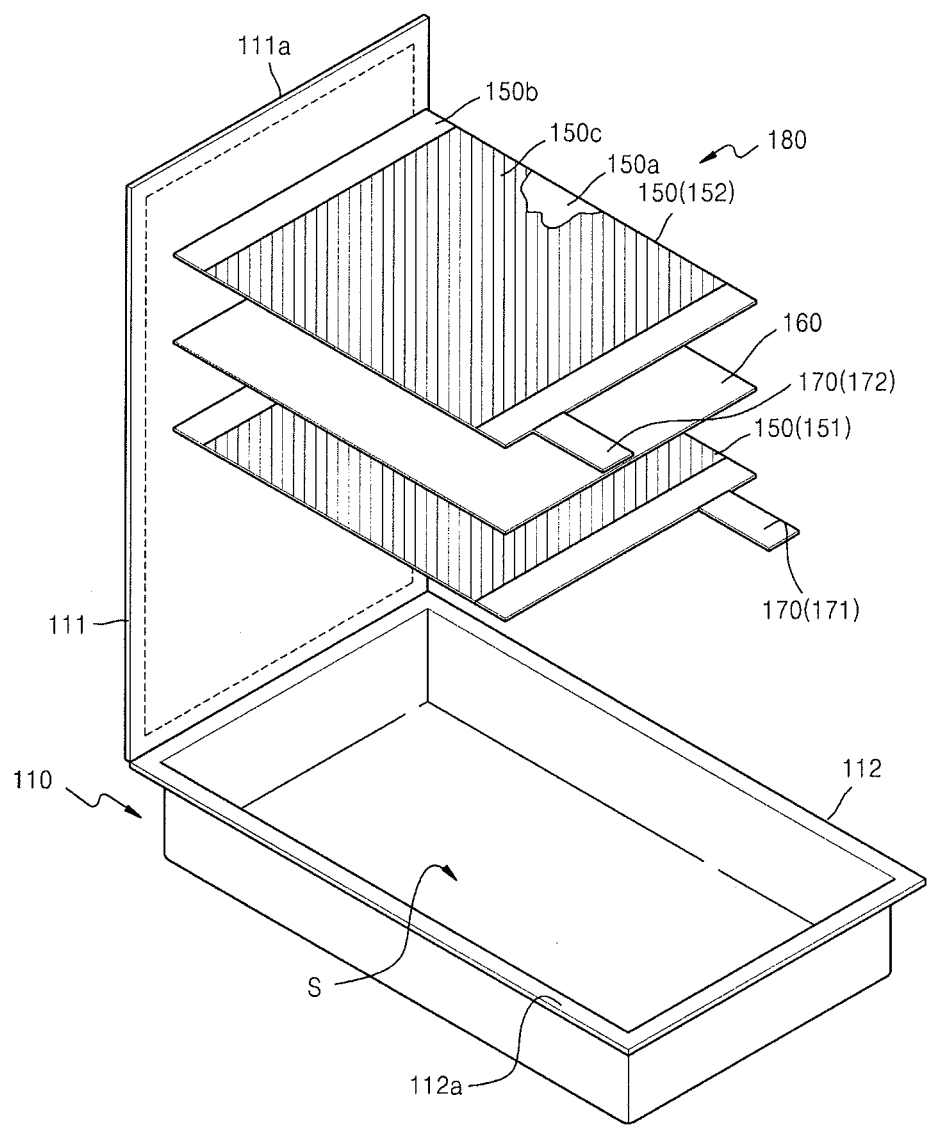
FIG. 2 is a disassembled perspective view of a portion of the secondary battery of FIG. 1.

FIG. 1 is a disassembled perspective view of a secondary battery according to an embodiment of the present invention. FIG. 2 is a disassembled perspective view of a portion of the secondary battery of FIG. 1.

Referring to FIG. 1, the secondary battery includes an electrode assembly 180, a plurality of electrode tabs 170 extended from the electrode assembly 180, lead terminals 190 electrically connected to the electrode tabs 170, and a battery case 110 accommodating the electrode assembly 180.

Referring to FIG. 2, the electrode assembly 180 may be formed by sequentially stacking electrode plates 150 while a separator 160 is interposed therebetween. For example, the electrode assembly 180 may have a stacked structure in which a first electrode plate 151, the separator 160, and a second electrode plate 152 are cut to a predetermined size and are sequentially stacked. A battery capacity of the stacked type electrode assembly 180 may be easily increased by increasing the stacking number of the electrode plates 150. For example, in order to increase a discharge capacity of the electrode assembly 180, a plurality of the first electrode plates 151 and a plurality of the second electrode plates 152 may be stacked or surface areas of the first electrode plate 151 and the second electrode plate 152 may be increased.

However, the electrode assembly 180 is not limited to the above-described stacked type and may alternatively have a winding structure in which the first electrode plate 151 and the second electrode plate 152 are a sheet type and wound in a roll form while the separator 160 is interposed therebetween.

The electrode plates 150 may be formed by coating a surface of an electrode collector 150a with an active material, and may include an active material layer 150c that is formed on at least one surface of the electrode collector 150a. For example, the first and second electrode plates 151 and 152 may be a positive electrode plate and a negative electrode plate, respectively. In this case, the first electrode plate 151 may include a positive electrode collector and a positive electrode active material layer formed on at least one surface of the positive electrode collector, and the second electrode plate 152 may include a negative electrode collector and a negative electrode active material layer formed on at least one surface of the negative electrode collector.

A non-coated portion 150b where the active material layer 150c is not formed may be formed on edges of the electrode plates 150. The non-coated portion 150b may be electrically connected to the electrode tabs 170, and a first electrode tab 171 and a second electrode tab 172 may be respectively electrically connected to the first electrode plate 151 and the second electrode plate 152 via the non-coated portion 150b. For example, the electrode tabs 170 may be coupled to the non-coated portion 150b via resistance welding, ultrasonic welding, laser welding, or the like.

The electrode tabs 170 may be formed of a metal having excellent conductivity; for example, the first and second electrode tabs 171 and 172 may be a positive electrode tab and a negative electrode tab, respectively, and the first electrode tab 171 may be formed of a metal such as aluminum or nickel, and the second electrode tab 172 may be formed of a metal such as copper or nickel.

As illustrated in FIG. 1, the electrode tabs 170 withdrawn from the electrode plates 150 stacked on one another are overlapped on one another, and the electrode tabs 170 in a clustered form are electrically connected to the lead terminals 190. The lead terminals 190, which form a coupling portion with the electrode tabs 170 and are integrally extended, may be withdrawn outside the battery case 110. For example, the electrode tabs 170 and the lead terminals 190 may be coupled to each other via ultrasonic welding or the like.

The lead terminals 190 may include a first lead terminal 191 that forms a coupling portion with a group of the first electrode tabs 171 and is extended from the first electrode tabs 171 and a second lead terminal 192 that forms a coupling portion with a group of the second electrode tabs 172 and is extended from the second electrode tabs 172.

The battery case 110 provides an accommodation space S accommodating the electrode assembly 180 and insulates and protects the electrode assembly 180 from external environments. The battery case 110 may include an exterior material that is formed by stacking a resin sheet on two surfaces of a metal thin layer; for example, the battery case 110 may include an aluminum stacking sheet.

The battery case 110 may include first and second cases 111 and 112 that form the accommodation space S accommodating the electrode assembly 180, and by bonding the first and second cases 111 and 112 while the first and second cases 111 and 112 face each other with the electrode assembly 180 interposed therebetween, the electrode assembly 180 may be encapsulated. In detail, the electrode assembly 180 and an electrolyte (not shown) may be encapsulated inside the battery case 110 by thermal bonding facing sealing portions 111a and 112a of the first and second cases 111 and 112. The battery case 110 may encapsulate the electrode assembly 180 and the electrolyte (not shown) in such a way that at least a portion of the lead terminals 190 is exposed.

The lead terminals 190 are extended from the electrode assembly 180, and are withdrawn outside the battery case 110 across the battery case 110. In detail, the lead terminals 190 may be withdrawn to the outside while being in an insulated state from the battery case 110, and crossing the battery case 110. An encapsulation tape 193 that is formed to provide electrical insulation between the battery case 110 and the lead terminals 190 may be interposed therebetween. The encapsulation tape 193 may be formed on the lead terminals 190, in detail, on portions of the lead terminals 190 that cross the battery case 110 along an extension direction of the lead terminals 190. At the portions where the lead terminals 190 and the battery case 110 cross each other, the encapsulation tape 193 is interposed between the lead terminals 190 and the battery case 110, and the lead terminals 190 and the battery case 110 contact each other via the encapsulation tape 193 included therebetween. The encapsulation tape 193 allows a close contact between the lead terminals 190 and the battery case 110, thereby increasing a degree of encapsulation of the battery case 110.

For example, the lead terminals 190 may be exposed to the outside via the sealing portions 111a and 112a of the first and second cases 111 and 112, and during an encapsulation operation in which the first and second sealing portions 110a and 112a are thermally bonded to each other while facing each other, the first and second cases 111 and 112 may be bonded to each other with the lead terminals 190 interposed in such a way that a portion of the lead terminals 190 is exposed. Here, the lead terminals 190 may be formed across the first and second sealing portions 111a and 112a of the battery case 110 and be extended to the outside. In addition, on portions on the lead terminals 190 that cross the battery case 110, specifically, the sealing portions 111a and 112a, the encapsulation tape 193 is disposed to electrically insulate the lead terminals 190 from the battery case 110. In addition, by interposing the encapsulation tape 193 between the lead terminals 190 and the battery case 110, the lead terminals 190 and the battery case 110 are in close contact, thereby improving the degree of encapsulation of the battery case 110.

Figure 3:
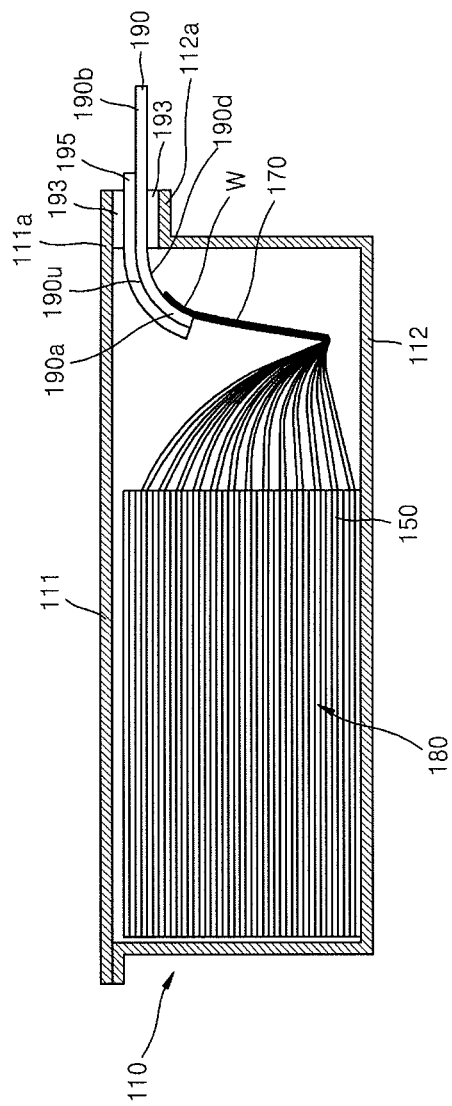
FIG. 3 is a cross-sectional view of the secondary battery of FIG. 1 cut along a line III-III.
Figure 4:
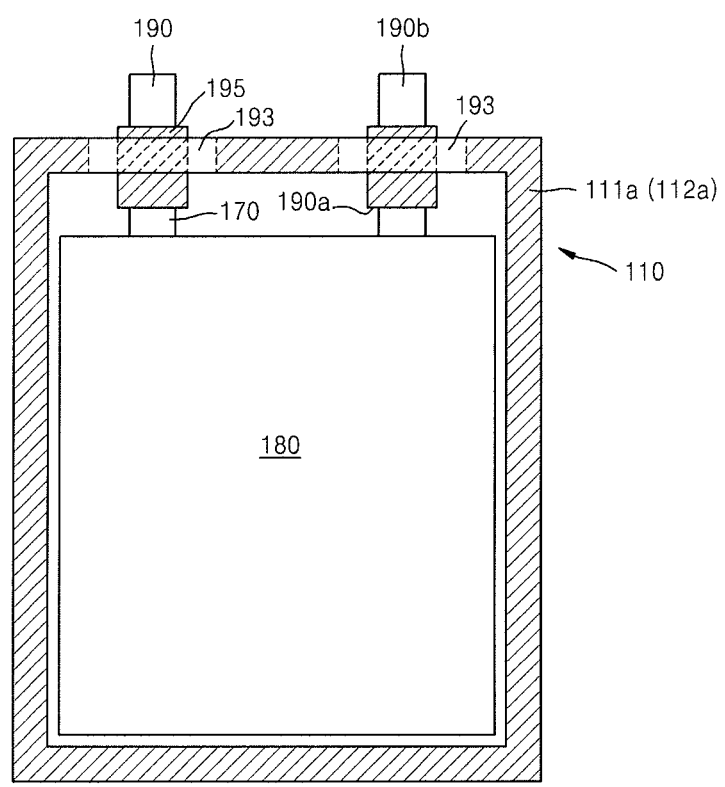
FIG. 4 is a plane view of the secondary battery of FIG. 1.
Figure 5:
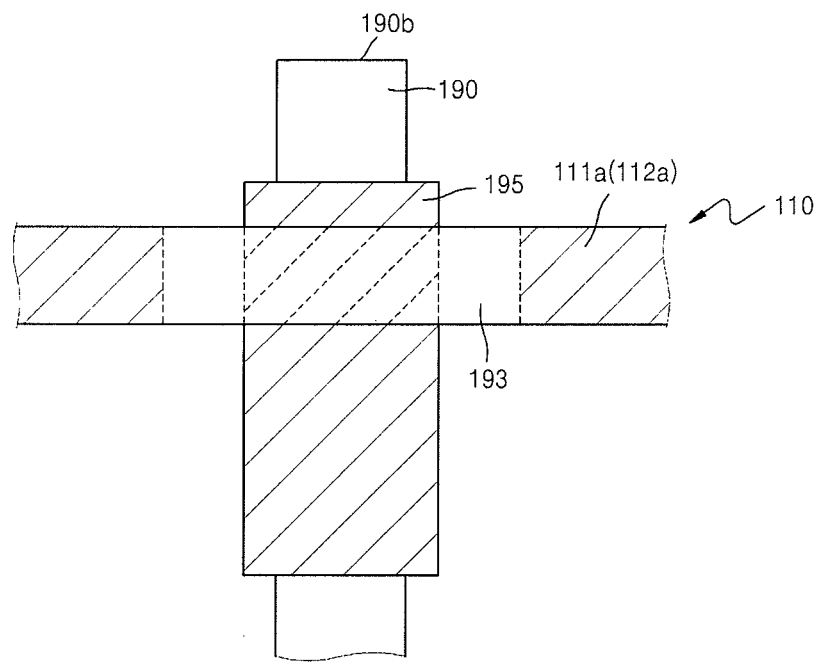
FIG. 5 is an expanded view of a portion of the secondary battery of FIG. 4.

FIG. 3 is a cross-sectional view of the secondary battery of FIG. 1 cut along a line FIG. 4 is a plane view of the secondary battery of FIG. 1. FIG. 5 is an expanded view of a portion of the secondary battery of FIG. 4.

Referring to FIG. 3, the group of electrode tabs 170 protruding from the plurality of electrode plates 150 are converged to a predetermined position in a stacking direction of the electrode assembly 180 so as to be coupled in a clustered form, and may be integrally coupled with the lead terminals 190 via a bonding portion W. For example, the bonding portion W may be formed as the group of electrode tabs 170 and the lead terminals 190 are thermally bonded by ultrasonic welding, and the electrode tabs 170 and the lead terminals 190 may be thermally bonded to each other by overlapping the electrode tabs 170 and the lead terminals 190 on one another and applying a high-frequency oscillation.

The lead terminals 190 may include a first end portion 190a that forms the bonding portion W with the group of electrode tabs 170 and a second end portion 190b that is integrally extended from the bonding portion W and is withdrawn outside the battery case 110. The first end portion 190a of the lead terminals 190 is disposed adjacent to the electrode assembly 180, and forms the bonding portion W with the electrode tabs 170 withdrawn from the electrode assembly 180.

The first end portion 190a of the lead terminals 190, which forms the bonding portion W with the electrode tabs 170, may be curved. By using the first end portion 190a, the bonding portion W having a curved form may be formed. By forming the bonding portion W between the lead terminals 190 and the electrode tabs 170 in a curved form, a space used for electrical connection between the lead terminals 190 and the electrode tabs 170 may be reduced.

In detail, the space for electrical connection between the electrode tabs 170 and the lead terminals 190 is formed between the electrode assembly 180 and the battery case 110 in a direction in which the electrode tabs 170 are withdrawn. The space functions as a limit factor that limits a size of the electrode assembly 180 and forms a dead space that does not contribute to battery capacity of the secondary battery but occupies a predetermined volume. However, by forming the bonding portion W in a curved form between the electrode tabs 170 and the lead terminals 190, the dead space may be reduced.

An insulation member 195 is formed on the lead terminals 190. The insulation member 195 may be formed on a position to be overlapped with the encapsulation tape 193, and may be extended toward the first end portion 190a of the lead terminals 190. In other words, the insulation member 195 may be extended from the first end portion 190a of the lead terminals 190 toward the second end portion 190b so as to overlap with the encapsulation tape 193.

As will be described later, the insulation member 195 is disposed to overlap the encapsulation tape 193 and may form an opening path around the encapsulation tape 193 when the secondary battery malfunctions due to overheating. This will be described in more detail later.

In addition, the insulation member 195 is formed on the first end portion 190a of the lead terminals 190 adjacent to the electrode assembly 180 and prevents an electrical short circuit between the electrode assembly 180 and the lead terminals 190. The insulation member 195 may also prevent a short circuit between positive and negative electrodes between the electrode assembly 180 and the lead terminals 190 and may contribute to increasing operating stability.

For example, the secondary battery may be subject to an external impact while undergoing an impact resistance test such as a drop test or an oscillation test or during distribution or use of a product, and due to the external impact, the first end portion 190a of the lead terminals 190 may physically contact the electrode assembly 180. In this case, an inner short circuit may be generated between the positive and negative electrodes between the first end portion 190a of the lead terminals 190 and the electrode assembly 180. By using the insulation member 195, which covers the first end portion 190a of the lead terminal 190 to electrically separate the first end portion 190a from the electrode assembly 180, an inner short circuit of the secondary battery may be prevented.

The first end portion 190a of the lead terminals 190 may be curved, and may be disposed to face the electrode assembly 180 and thus the first end portion 190a may contact the electrode assembly 180. The insulation member 195 may be formed on a first surface 190u of the lead terminals 190 disposed to face the electrode assembly 180. However, the insulation member 195 may be formed on at least one surface from among the first surface 190u and a second surface 190d of the lead terminals 190, or on both the first and second surfaces 190u and 190d.

The insulation member 195 may function as a safety device that prevents deterioration or explosion of the secondary battery when the secondary battery malfunctions. The insulation member 195 may be formed of a low-melting point material, and when the insulation member 195 is overheated at an abnormally high temperature, the insulation member 195 may deform (e.g., soften and or melt) in a fused or semi-fused state. As a result, at least a portion and is removed from a space thereof to provide the opening path, which releases the encapsulated state of the battery case 110, thereby opening the secondary battery to the outside.

For example, in one embodiment, the insulation member may be formed from a polymer. The insulation member may be relatively rigid and adopt a first shape at a temperature less than its glass transition temperature. At temperatures greater than the glass transition temperature and less than the melting temperature of the insulation member, the insulation member may deform and adopt a second shape, different from the first shape. At temperatures greater than the melting temperature of the insulation member, the insulation member may further melt and adopt a third shape. Either the second or the third shape of the insulation member may provide the opening path.

Through the opening path formed by high-temperature fusion of the insulation member 195, the encapsulated state of the battery case 110 is released to open inner and outer portions of the battery case 110. A conversion of the insulation member 195, which maintains the battery case 110 in the encapsulated state, opens the battery case 110 and is performed when it is necessary to stop an operation of the secondary battery at a high temperature. Through the opening path provided by the insulation member 195, water from the outside may flow into the battery case 110 to block or stop an operation of the secondary battery to prevent overheating or explosion of the secondary battery due to further operations, and also, an electrolyte gas accumulated inside at a high pressure may be discharged to prevent explosion according to accumulation of an inner pressure.

The insulation member 195 may be disposed at a position to overlap the encapsulation tape 193 encapsulating the battery case 110. The insulation member 195 overlapped with the encapsulation tape 193 is in a solidified state during a normal operation so as to tightly encapsulate the battery case 110 with the encapsulation tape 193. However, if overheating occurs, the insulation member 195 is melted and forms the opening path around the encapsulation tape 193.

The insulation member 195 and the encapsulation tape 193 are both formed on the lead terminals 190, and are overlapped with each other on at least a portion of the lead terminals 190 in a length direction. For example, the insulation member 195 may be interposed between the lead terminals 190 and the encapsulation tape 193. When abnormal overheating occurs, the insulation member 195 interposed between the lead terminals 190 and the encapsulation tape 193 is melted and removed, thereby forming the opening path between the lead terminals 190 and the encapsulation tape 193. In detail, the insulation member 195 disposed to overlap with the encapsulation tape 193 may melt in a fused or semi-fused state and be removed from a space thereof to provide the opening path. However, it is sufficient when the insulation member 195 overlaps with only a portion of the encapsulation tape 193, and the insulation member 195 and the encapsulation tape 193 do not have to entirely overlap with each other.

The insulation member 195 is formed on the lead terminals 190, and the encapsulation tape 193 may be formed along circumferences of the insulation member 195 and the lead terminals 190. For example, the encapsulation tape 193 may be thermally bonded between the sealing portions 111a and 112a when the first and second cases 111 and 112 are bonded together, thereby encapsulating the battery case 110. Accordingly, due to the thermal bonding, the encapsulation tape 193 may be formed of a material having a relatively high melting point so as to maintain stability with regard to form. For example, the encapsulation tape 193 may maintain a stable form by being coupled to the battery case 110 even when the battery case 110 is opened.

The insulation member 195 is formed between the encapsulation tape 193 and the lead terminals 190, and is formed of a material having a relatively low melting point, and if abnormal overheating occurs, the insulation member 195 is removed by being fused or semi-fused to thereby form the opening path between the encapsulation tape 193 and the lead terminals 190. Although the insulation member 195 has a relatively low melting point, when the first and second cases 111 and 112 are thermally bonded to each other, the insulation member 195 may be protected by being covered by the encapsulation tape 193 having a relatively high melting point. Thus the insulation member 193 may not be melted during the thermal bonding and maintain stability in terms of form.

The insulation member 195 may be formed of a low-melting point insulating material, for example, a material having a melting point that is lower that of the encapsulation tape 193 by about 10° C. to about 20° C. For example, if the encapsulation tape 193 is formed of a material having a melting point of about 160° C., such as polypropylene (PP), the insulation member 195 may be formed of a material having a melting point of about 150° C. or lower.

A maximum operating temperature of the secondary battery is about 97° C., and the secondary battery is likely to ignite at about 150° C. or higher. In this respect, the insulation member 195 may be formed of an insulating material having a melting point between about 100° C. and about 150° C.

Figure 6:
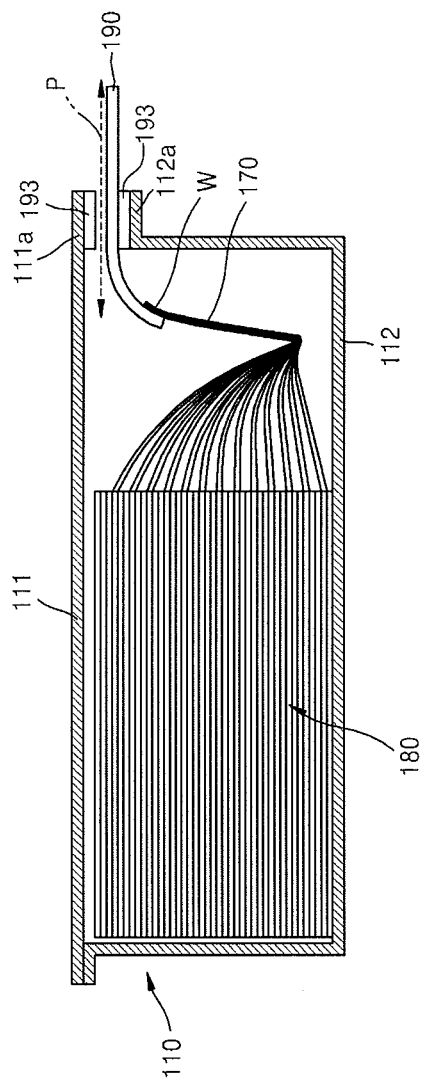
FIGS. 6 and 7 illustrate formation of an opening path in the case of the secondary battery of FIG. 1 as an insulation member is melted and removed.
Figure 7:
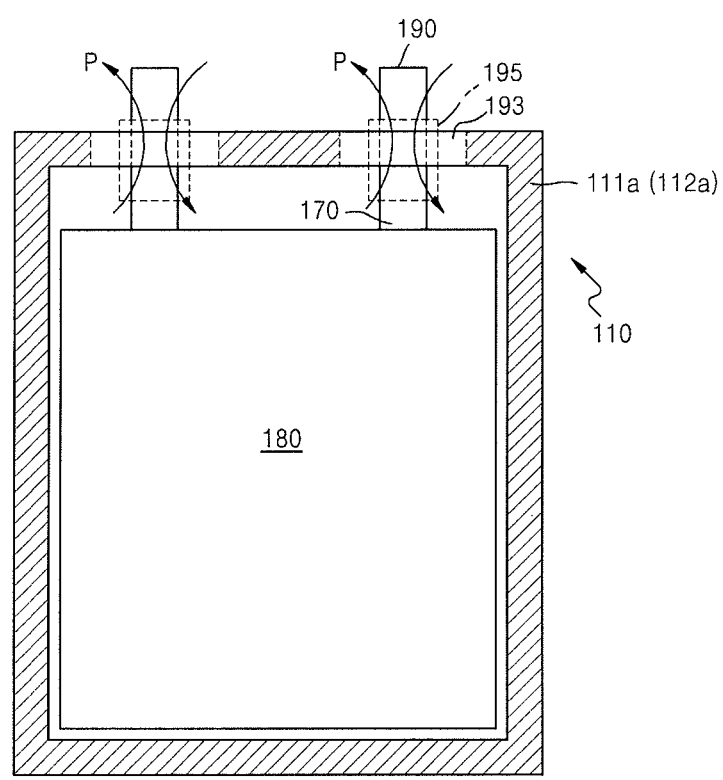

FIGS. 6 and 7 illustrate how an opening path P is formed according to melting and removal of the insulation member 195. Referring to FIGS. 6 and 7, when the secondary battery is overheated abnormally, the insulation member 195 held between the lead terminals 190 and the encapsulation tape 193 is softened in a fused or semi-fused state to provide space of the insulation member 195 as an opening path P. For example, as illustrated in FIG. 6, the opening path P may be formed between the lead terminals 190 and the encapsulation tape 193 as the insulation member 195 is melted and removed. Through the opening path P, water from the outside may penetrate into the battery case 110 to block or stop an operation of the secondary battery. In addition, an electrolyte gas accumulated in the battery case 110 may be discharged outside the battery case 110 through the opening path P, thereby removing danger of explosion due to accumulation of an inner pressure.

Referring to FIG. 7, the insulation member 195 and the encapsulation tape 193 are formed to overlap with each other on the lead terminals 190, and as the insulation member 195 is melted and removed in a high-temperature and abnormal overheated state, a space that the insulation member 195 occupied may be provided as the opening path P.

Figure 8:
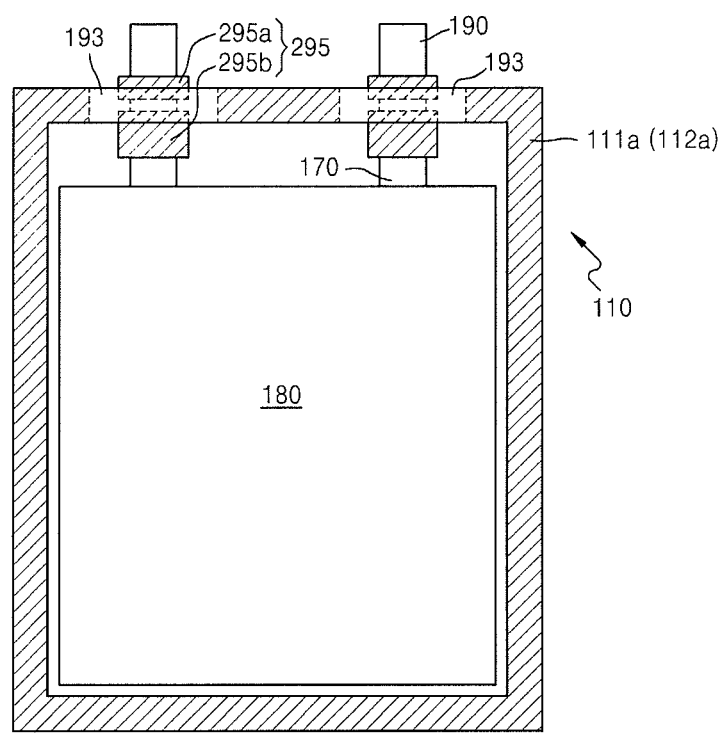
FIG. 8 is a plan view of a secondary battery according to another embodiment of the present invention.
Figure 9:
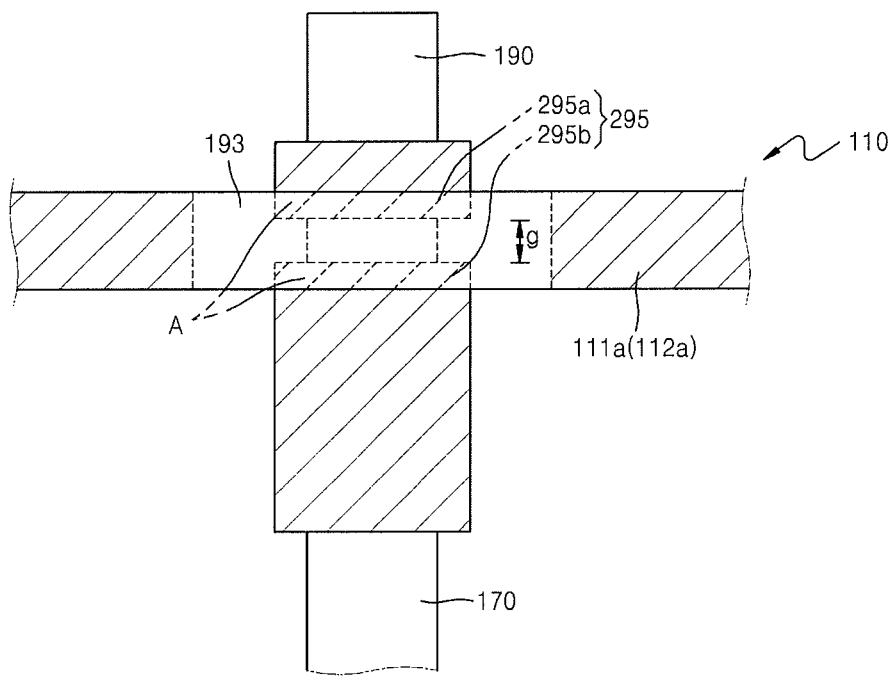
FIG. 9 is an expanded view of a portion of the secondary battery of FIG. 8.

FIG. 8 is a plan view of a secondary battery according to another embodiment of the present invention. FIG. 9 is an expanded view of a portion of the secondary battery of FIG. 8. Referring to FIGS. 8 and 9, an insulation member 295 and the encapsulation tape 193 are disposed on the lead terminals 190 extended from the electrode assembly 180. The insulation member 295 and the encapsulation tape 193 may be formed in positions overlapping with each other in at least a portion of the lead terminals 190 in a length direction. For example, the insulation member 295 may be disposed on the lead terminals 190, and the encapsulation tape 193 may be formed along circumferences of the insulation member 295 and the lead terminals 190. For example, the encapsulation tape 193 may be formed along a circumference of the lead terminals 190 so as to cover at least a portion of the insulation member 295.

The insulation member 295 may include first and second insulating members 295a and 295b that are arranged in a length direction of the lead terminals 190. As illustrated in FIG. 9, the first and second insulation members 295a and 295b may be spaced apart from each other at a distance g. The encapsulation tape 193 is formed to cover a portion of the first and second insulation members 295a and 295b and cover the distance g therebetween. The insulation member 295 including separate portions, that is, the first and second insulation members 295a and 295b, instead of a single continuous form, and the distance g between the first and second insulation members 295a and 295b are formed in order to adjust an opening time of the insulation member 295.

The opening time of the insulation member 295 may be varied according to an overlapping area A between the encapsulation tape 193 and the insulation member 295. The insulation member 295 is formed of a low-melting point material and may melt in a fused or semi-fused state and removed from a space thereof to provide an opening path. Here, as the insulation member 295 held between the encapsulation tape 193 and the lead terminals 190 is removed by melting, the opening path may be formed between the encapsulation tape 193 and the lead terminals 190, and the overlapping area A of the insulation member 295 formed to overlap with the encapsulation tape 193 may correspond to an area that is to be melting and removed in order to open the battery case 110.

If the overlapping area A of the insulation member 295 is increased, an increased amount of heat is required to remove the increased overlapping area A, and the opening time of the insulation member 295 may be delayed. On the other hand, if the overlapping area A of the insulation member 295 is reduced, the insulation member 295 may be removed with a reduced amount of heat corresponding to the reduced surface area, and the opening time of the insulation member 295 may be moved up.

Another aspect about the relationship between the overlapping area A of the insulation member 295 and the opening time of the insulation member 295 is as follows. When heat is abnormally generated, the insulation member 295 melts in a fused or semi-fused state and is pushed away due to an inner pressure accumulated in the battery case 110 and thus a space of the insulation member 295 as provides the opening path. Here, by removing the insulation member 295 held between the encapsulation tape 193 and the lead terminals 190, the opening path may be formed between the encapsulation tape 193 and the lead terminals 190, and the overlapping area A of the insulation member 295 may correspond to an area that is to be melted and removed in order to open the battery case 110.

When the overlapping area A of the insulation member 295 increases, an inner pressure accumulated to push out the increased overlapping area A and remove the insulation member 295 is increased, and the opening time of the insulation member 295 may be delayed. On the other hand, when the overlapping area A of the insulation member 295 is reduced, the insulation member 295 may be removed at a reduced inner pressure corresponding to the reduced surface area, and the opening time of the insulation member 295 may be moved up.

As illustrated in FIG. 9, instead of forming the insulation member 295 to have a continuous form, the insulation member 295 is formed of two portions, the first and second insulation members 295a and 295b, and the distance g between the first and second insulation members 295a and 295b is formed. Accordingly, the overlapping area A of the insulation member 295 overlapped with the encapsulation tape 193 may be adjusted, and for example, the distance g overlapped with the encapsulation tape 193 may be extended or shortened to adjust the opening time of the insulation member 295.

Figure 10:
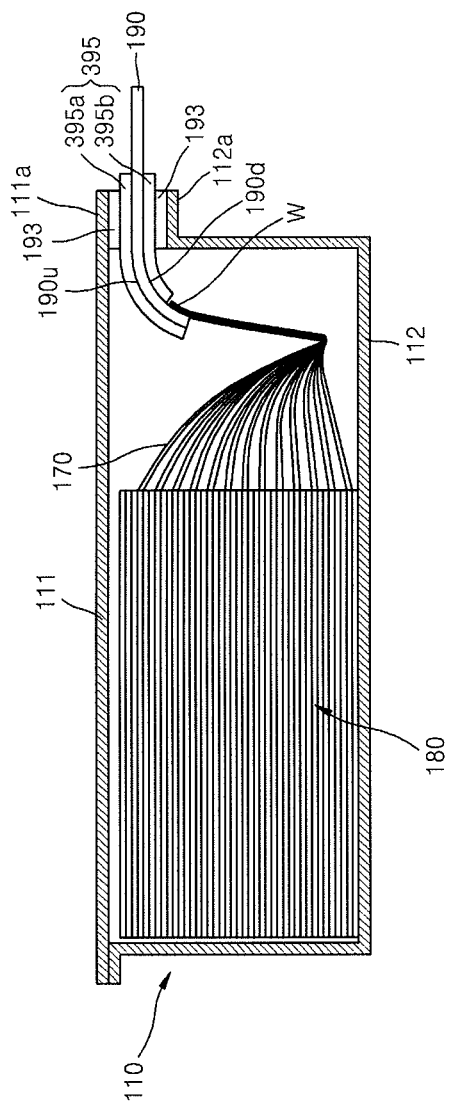
FIG. 10 illustrates a secondary battery according to another embodiment of the present invention.
Figure 11:
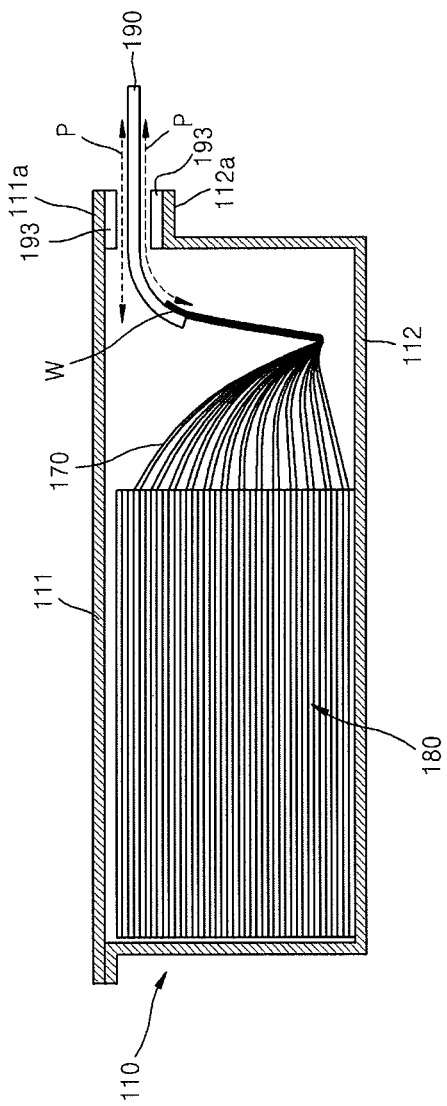
FIG. 11 is illustrates formation of an opening path in the case of the secondary battery of FIG. 10 as an insulation member of FIG. 10 is melted and removed.

FIG. 10 illustrates a secondary battery according to another embodiment of the present invention. FIG. 11 is illustrates how an opening path P is formed as the insulation member 395 is melted and removed, under an abnormal high-temperature environment.

Referring to FIGS. 10 and 11, in an embodiment the insulation member 395 may be formed not only on the first surface 190u but also on the second surface 190d of the lead terminals 190. That is, the insulation member 395 may include first and second insulation members 395a and 395b that are respectively formed on the first and second surfaces 190u and 190d of the lead terminals 190.

The first insulation member 395a formed on the first surface 190u of the lead terminals 190 maintains an electrically insulated state of the electrode assembly 180 and is softened at a high temperature during an abnormal operation so as to open a space of the first insulation member 395a and provide the space as an opening path P.

Since the first surface 190u of the lead terminals 190 faces the electrode assembly 180, a physical contact between the lead terminals 190u and the electrode assembly 180 may occur. Accordingly, the first insulation member 395a disposed on the first surface 190u of the lead terminals 190 may effectively prevent an inner short circuit as described above.

The second insulation member 395b formed on the second surface 190d of the lead terminals 190 provides the opening path P together with the first insulation member 395a, and may increase an opening degree between inner and outer portions of the battery case 110 in an abnormal condition. In addition, the second insulation member 395b may facilitate fast stabilization of the battery case 110. That is, by forming the insulation member 395 on both the first and surfaces 190*u* and 190*d* of the lead terminals 190, the opening degree of the opening path P provided by the insulation member 395 in case of high-temperature overheating may be increased.

The second insulation member 395*b* formed on the second surface 190*d* of the lead terminals 190 may be not formed on some portions of the second surface 190*d*; for example, the second insulation member 395*b* may be formed on the second surface 190*d* except for a portion of the second surface 190*d* corresponding to the bonding portion W between the lead terminals 190 and the electrode tabs 170. The electrode tabs 170 withdrawn from the electrode assembly 180 are densely formed toward the lead terminals 190 in a clustered form, and form the bonding portion W with the lead terminals 190; the electrode tabs 170 may be coupled to the lead terminals 190 via the second surface 190*d* of the lead terminals 190. The electrode tabs 170 and the lead terminals 190 may be bonded to each other via ultrasonic welding, and the insulation member 395 may not be formed on the bonding portion W formed between the lead terminals 190 and the electrode tabs 170 so that the second insulation member 395*b* does not disturb the coupling.

According to the secondary battery of the embodiments of the present invention, an inner short circuit between positive and negative electrodes due to an external impact may be prevented so as to improve impact resistance characteristics, and in case a malfunction occurs due to overheating, the battery case may be opened to block or stop an operation of the secondary battery, and an electrolyte gas accumulated in the battery case may be discharged to the outside to thereby reduce danger of ignition or explosion.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery comprising:
    an electrode assembly;
    a battery case accommodating the electrode assembly;
    a lead terminal that is extended from the electrode assembly and across the battery case, wherein the lead terminal is withdrawn to the outside of the battery case wherein the lead terminal comprises a first end portion that is adjacent to the electrode assembly and a second end portion that is withdrawn to the outside;
    an encapsulation tape formed on a portion of the lead terminal crossing the battery case wherein the first end portion of the lead terminal is spaced from the encapsulation tape; and
    an insulation member that is formed on the lead terminal to overlap with at least a portion of the encapsulation tape wherein the insulation member is extended from the first end portion inside the battery case toward the second end portion outside of the battery case so as to overlap with the encapsulation tape and so that portions of the insulation member extend into the battery case and out of the battery case that are not overlapped with the encapsulation tape wherein the insulation member is interposed between the lead terminal and the encapsulation tape and wherein the insulating member is formed of an insulating resin having a melting point lower than the encapsulation tape and wherein the melting point and the thickness of the insulation member at the interface between the insulation member and the battery case is selected so that insulation member transforms into a fused or semi-fused state and the encapsulation tape maintains stability with regard to form whereby a path is formed between the interior of the battery case and the exterior of the battery case when the battery case exceeds a pre-selected temperature.

2. The secondary battery of claim 1, wherein the lead terminal has first and second surfaces, and the insulation member is formed on the first surface of the lead terminal facing the electrode assembly.

3. The secondary battery of claim 1, wherein the encapsulation tape is coupled to the battery case.

4. The secondary battery of claim 1, wherein the insulation member is formed on the lead terminal, and the encapsulation tape is formed along a circumference of the lead terminal so as to cover at least a portion of the insulation member.

5. The secondary battery of claim 1, wherein the lead terminal has first and second surfaces that face away from each other, and is connected to an electrode tab withdrawn from the electrode assembly, via the second surface, and the insulation member is formed on the first surface of the lead terminal.

6. The secondary battery of claim 5, wherein the insulation member is also formed on the second surface of the lead terminal, wherein the insulation member is formed on the second surface except for a portion corresponding to the bonding portion between the lead terminal and the electrode tab.

7. The secondary battery of claim 1, wherein the insulation member comprises first and second insulation members that are spaced apart from each other while including a distance therebetween in a length direction of the lead terminal.

8. The secondary battery of claim 7, wherein the encapsulation tape is formed to cover at least a portion of the first and second insulation members and the distance.

9. The secondary battery of claim 8, wherein, according to an increase or a reduction in an overlapping surface area between the encapsulation tape and the first and second insulation members, an opening time of the battery case is adjusted according to melting of the first and second insulation members.

10. The secondary battery of claim 1, wherein the insulation member is formed of an insulating resin having a melting point between about 100° C. and about 150° C.

11. The secondary battery of claim 1, wherein the insulation member is formed of an insulation resin having a melting point lower than that of the encapsulation tape by about 10° C. to about 20° C.

12. The secondary battery of claim 1, wherein the case comprises facing first and second cases that are bonded to each other so as to accommodate the electrode assembly, and the encapsulation tape is formed between facing sealing portions of the first and second cases and wherein the encapsulation tape is formed to surround the lead terminal withdrawn to the outside via the facing sealing portions of the first and second cases and the insulation member formed on the lead terminal.

13. A secondary battery comprising:
    an electrode assembly;
    a battery case accommodating the electrode assembly;
    a lead terminal comprising a first end portion that is electrically connected to an electrode tab withdrawn from the electrode assembly inside of the battery case and a second end portion that is extended across the battery case to be withdrawn to the outside;
    an encapsulation tape formed between the first and second end portions of the lead terminal and on a portion of the lead terminal crossing the battery case wherein the first end portion is spaced from the encapsulation tape in the battery case; and an insulation member that is extended from the first end portion inside of the battery case toward the second end portion outside of the battery case so as to overlap with the encapsulation tape and so that portions of the insulation member extend into the battery case and out of the battery case that are not overlapped with the encapsulating tape wherein the insulation member is interposed between the lead terminal and the encapsulation tape and wherein the insulating member is formed of an insulating resin having a melting point lower than the encapsulation tape and wherein the melting point and the thickness of the insulation member at the interface between the insulation member and the battery case is selected so that insulation member transforms into a fused or semi-fused state and the encapsulation tape maintains stability with regard to form whereby a path is formed between the interior of the battery case and the exterior of the battery case when the battery case exceeds a pre-selected temperature.

14. A secondary battery, comprising:

a battery case comprising a first case and a second case that face each other with an electrode assembly interposed therebetween, wherein the first and second cases are bonded at respective sealing portions of the first and second cases;

a lead terminal extending from the electrode assembly inside of the battery case to outside of the secondary battery;

an encapsulation tape formed on a portion of the lead terminal crossing the battery case wherein the first end portion of the lead terminal is spaced from the encapsulation tape; and an insulating member interposed between the lead terminal and at least one sealing portion that extends from inside of the battery case adjacent the electrode assembly to outside of the battery case wherein a portion of the insulating member positioned adjacent the electrode assembly is spaced from the sealing portions of the first and second case and so that a portion of the insulation member which extends into the battery case and a portion that extends out of the battery case are not overlapped with the encapsulation tape;

wherein the insulating member has a thickness and a melting temperature so that the insulting member adopts a first shape at a first operating temperature of the secondary battery that is lower than the melting temperature of the insulating member and adopts a second shape, different from the first shape, at a second temperature that is higher than the melting temperature of the insulating member and wherein the encapsulation tape maintains stability with regard to form at the second temperature;

wherein the secondary battery is encapsulated when the insulating member adopts the first shape and an opening is formed in the battery case when the insulating member adopts the second shape and so that portions of the insulation member extend into the battery case and out of the battery case that are not overlapped with the sealing portions of the first and second case.

15. The secondary battery of claim 14, further comprising an encapsulation tape interposed between the insulating member and an adjacent sealing portion.

16. The secondary battery of claim 14, wherein the insulation member comprises first and second insulation members that are spaced apart from each other by a selected distance overlapping the adjacent sealing portion.

* * * * *